United States Patent
Gerber et al.

(10) Patent No.: US 6,459,660 B1
(45) Date of Patent: Oct. 1, 2002

(54) DUAL HALF-APERTURE FOCUSING AND PUSH-PULL TRACKING USING A 3-BEAM WOLLASTON PRISM FOR MAGNETO-OPTICAL DATA STORAGE

(75) Inventors: Ronald E. Gerber, S. Richfield; Edward C. Gage, Apple Valley, both of MN (US)

(73) Assignee: Seagate Technology, LLC., Scotts Valley, CA (US)

( * ) Notice: Subject to any disclaimer, the term of this patent is extended or adjusted under 35 U.S.C. 154(b) by 0 days.

(21) Appl. No.: 09/330,459

(22) Filed: Jun. 11, 1999

Related U.S. Application Data

(60) Provisional application No. 60/088,997, filed on Jun. 11, 1998.

(51) Int. Cl.[7] .................................................. G11B 7/00
(52) U.S. Cl. .................................. 369/44.23; 369/44.44
(58) Field of Search ........................... 369/44.23, 44.41, 369/44.37, 112.03–112.14, 112.28

(56) References Cited

U.S. PATENT DOCUMENTS

| | | | |
|---|---|---|---|
| 5,282,188 A | 1/1994 | Gage | 369/110 |
| 5,347,297 A | 9/1994 | Gage et al. | 346/108 |
| 5,353,272 A | 10/1994 | Gage et al. | 369/120 |
| 5,742,572 A | * 4/1998 | Tezuka et al. | 369/44.23 |
| 5,898,661 A | * 4/1999 | Morimoto | 369/44.23 |

FOREIGN PATENT DOCUMENTS

JP     63-275044    * 11/1988

OTHER PUBLICATIONS

"Optical Recording, A Technical Overview" by Alan B. Marchant, Chapter 7, Focus and Tracking Servos, pp. 165 to 193, ©1990 by Addison–Wesley Publishing Company, Inc., ISBN 0–201–76247–1.

"Handbook of Magneto–Optical Data Recording: Materials, Subsystems, Techniques" Edited by Terry W. McDaniel and Randall H. Victora, pp. 98–109, © 1997 by Noyes Publications, ISBN 0–8155–1391–7.

* cited by examiner

Primary Examiner—Thang V. Tran
(74) Attorney, Agent, or Firm—Moser, Patterson & Sheridan, LLP

(57) ABSTRACT

A focus and tracking error system in which a light source such as a laser diode, a beam splitter, a collimating lens, a focussing lens, a 3-beam splitter, a beam diverter, and an optical detector pass a beam to a data media track, with the beam reflecting from the track into a 3-beam splitter, such as a Wollaston prism, through a beam diverter, such as a bi-wedge into an optical detector to form a pair of differential signals for the focussing error, and positioning, reflectivity data signals, and magneto-optical signals.

14 Claims, 6 Drawing Sheets

DUAL HALF-APERTURE FOCUSING AND PUSH-PULL TRACKING USING A 3-BEAM WOLLASTON PRISM FOR MAGNETO-OPTICAL DATA STORAGE

CROSS-REFERENCE TO RELATED APPLICATIONS:

The present application claims priority to Provisional Application No. 60/088,997 filed Jun. 11, 1998, which is incorporated herein by reference.

FIELD

This invention is directed to controlling the reading and writing of data residing on substantially flat media, and more particularly to controlling the alignment of read/write heads used for reading and writing data on substantially flat media.

PRIOR ART

Reading and writing data to and from substantially flat media used in magneto-optical storage requires a read/write head configured to "fly" above the media on an actuator arm, deriving a signal that is then processed by a preamplifier (also called preamp) mounted on or proximal the base supporting the actuator arm.

In order to find the data, the read/write head must be precisely directed to a "track" on the substantially flat media on which the data resides. On media where a contrast exists between the data tracks and the "field" of the substantially flat media; with "field" being defined herein as those areas between the data tracks in which no data is written; the information allowing precise direction may be derived from reflection data.

As data has become steadily denser and more speed is required, tolerances have become ever closer. This means that precisely directing the head, called "positioning", is becoming steadily more difficult. Four parameters are often involved in positioning; focus error signal, tracking error signal, reflectivity data signal, and magneto-optical data signal. While all of these are important, it has been found that focus error is very sensitive to various factors tending to degrade performance, such as misalignment, thermal drifts, and wavelength shifts.

One means often used to improve the performance of sensitive functions is the use of the so-called differential amplifier. Differential amplifiers have the advantage over other amplifier types that the differential amplifier need resolve only a small difference between two signal leads, rather than the absolute value of a signal. Additionally, the signal is normally presented on both inputs to the differential amplifier, but with an inverse phase relationship. This may have the advantage of causing the signal strength to be improved.

Unfortunately, the positioning devices of the prior art have not provided a differential signal for applying to a suitable amplifier.

The present invention will be seen to provide a solution to this and other problems, such as the possibility of less cost of a positioning system, due to relaxed absolute values that might be used at a given level of performance.

SUMMARY

A differential signal for focus error is provided in a positioning system. A light beam, such as a laser beam, is focussed on a track disposed for maintaining a head position. The head reads and writes data from media through a system including a half-aperture beam-splitter, collimating and focussing system. A reflection, which is directed by the collimating and focussing system back to the half-aperture beam-splitter and focussed with the aid of additional optical processing elements on a novel detector system, develops a differential signal proportional to the focussing error as well as a tracking error signal, reflectivity data signal, and magneto-optical data signal.

Presenting the focussing error signal in differential form provides a more stable and more easily discerned signal whereby higher performance with improved quality is obtained.

BRIEF DESCRIPTION

DETAILED DESCRIPTION

Figure 1A:
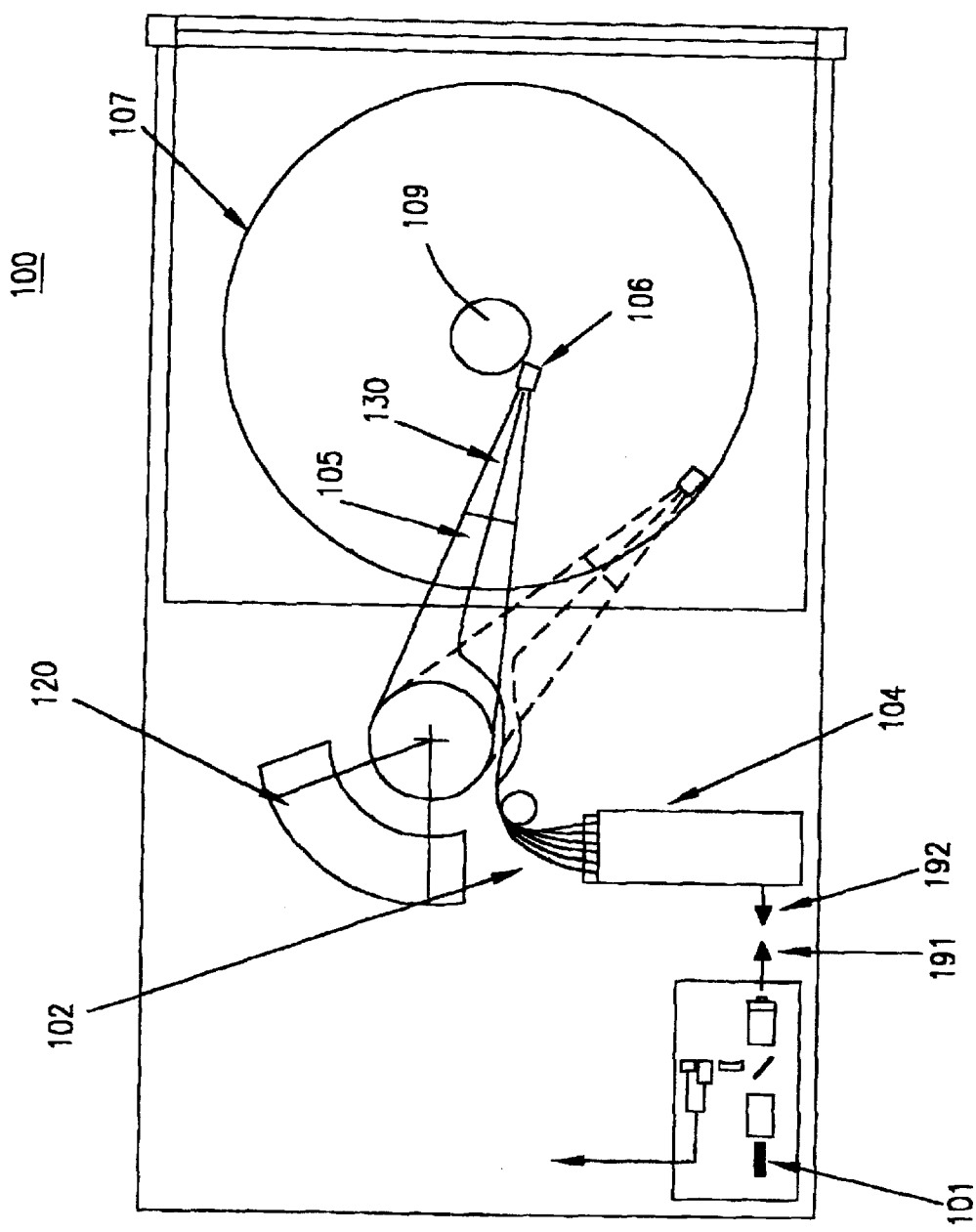
FIG. 1A is a magneto-optical drive system used to write and read data to magneto-optical data media. A focusing and tracking system is included in the head assembly as part of the write/read system.

An embodiment of a write/read drive 100 is shown in FIG. 1A. A signal processing system 101, which may include the focussing and tracking system of the invention, is located to communicate with a fiber optic light beam distribution system 104 by way of communication links 191 and 192. As shown, 191 delivers a light beam to the distribution system 104, and 192 delivers reflected light from the data media to the signal processing system 101.

Fiber optic connections 102 distribute the light beams, both those associated with 191 and those associated with 192, to a plurality of heads, represented by head 106, through a plurality of actuator arms such as actuator arm 130, by way of support 105. Data media 107, in the form of a substantially flat disk mounted on hub 109, is written to and read by head 106. Rotary actuator 120 drives support 105 and actuator arm 130.

Figure 1B:
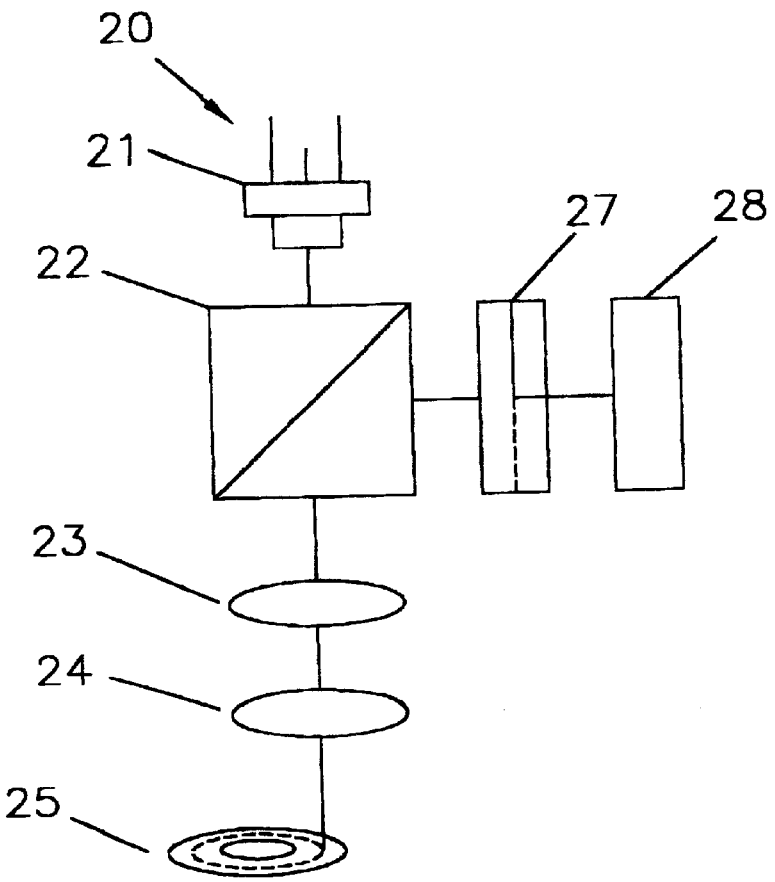
FIG. 1B is a prior art focussing and tracking system of the prior art showing how a bi-wedge may be used to diffract a reflected beam to an optical detector.

In an embodiment of the prior art, focus/tracking system 20 is shown in FIG. 1B, forming a part of signal processing system 101. Light from laser diode 21 passes through beam splitter 22. The light passing through beam splitter 22 is collimated by lens 23 and brought into focus by lens 24. As used herein and generally, collimation is a process by which divergent rays of light are bent into a parallel beam of light. The collimated and focused light from the laser diode reflects off optical disk 25 and returns through lens 24, where it is recollimated by lens 23. As shown in "Optical Recording a technical overview" by Alan B. Marchant, published by Addison-Wesley Publishing Company, starting on page 174, a focussed beam of coherent light as described above creates a diffraction pattern when applied to a tracking groove. This pattern develops a 0th, 1st, and −1st order set of plane waves which are closely associated, with, in many cases, the 1st and −1st waves overlapping and partially interfering with the 0th wave, but not with each other. As explained by Marchant, this is a characteristic of tightly focussed waves, a condition that is typical of the positioning systems of this nature. Other orders for the waves exist, but as taught by Marchant, are spaced at angles wherein they do not contribute to the tracking system reflection. Also as explained by Marchant on page 175, the interference produces a differential signal; however, Marchant implies that the differential signal produced is of a type useful primarily for tracking, and does not discuss means for achieving a differential signal of the focus error, as provided herein by the inventor.

Marchant on page 176 points out that while the sensitivity to tracking can be very high, on page 177 he explains that the "optical situation is complicated when focus and tracking sensors are combined." Marchant discusses astigmatic focus sensing, and implies that only absolute focus measurements apply by stating that in the case of astigmatic focus combined with tracking, the "spot shape is far from circular". Thereby Marchant indicates a pessimism for determining a differential focusing error, where differential measurements as taught by the references such as Marchant, pages 174–175, are based on circular spots. In this reference, Marchant teaches away from the present invention, along with the other references found by the Applicant.

The collimated reflected light is further reflected at an angle by beamsplitter 22 in order to pass through bi-wedge 27, and collected by multi-element detector 28.

Figure 2:
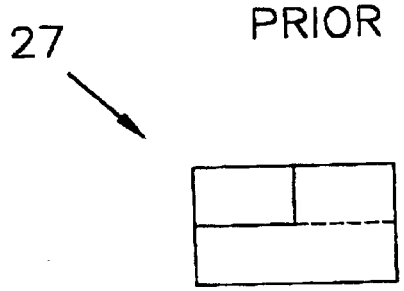
FIG. 2 is a bi-wedge of the type shown in FIG. 1B. It is labeled prior art, but applies to the invention as well.
Figure 2:
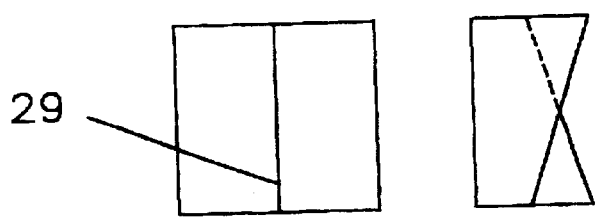

In this embodiment of the prior art, the bi-wedge 27 is shown in FIG. 2. Bi-wedge 27 comprises two prisms attached along a line 29 that is substantially parallel to the in-track direction of the optical disk 25. Optical disk 25 is rotating around a center, but for the focus/tracking system 20, the track is traveling in what appears to be a straight line, since the radius of the disk is large compared to the size of the spot tracked by the focus/tracking system 20. Consequently, the line 29 is apparently parallel, both horizontally and vertically, to line 29, called the "in-track" direction in the art and is aligned to the center of the track.

The effect of the prisms on the collimated reflected light from beam splitter 22 is to further reflect substantially half the collimated reflected light in a generally downward direction; being the left half in FIG. 2, where the beam is assumed to be directed at the disjoint face of bi-wedge 27. Another half of the collimated reflected light is further reflected in an generally upward direction by the right half of bi-wedge 27.

Figure 3:
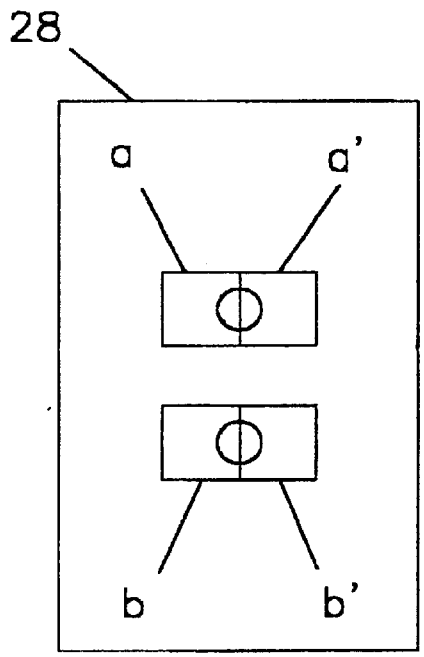
FIG. 3 is an optical detector of the prior art, showing multiple optical sensors.

The two beams are then made incident on a multi-element detector 28 in FIG. 3. Multi-element detector 28 has four detectors; two, 28a and 28a', and identified as a and a' in FIG. 3, and two, 28b and 28b', and identified as b and b' in FIG. 3. The left half beam is split between b and b', and the right half beam is split in a similar manner to a and a'.

The detectors of the prior art disclosed in FIG. 2 are shown in FIG. 3. Here the focussing error and tracking error is detected as functions of the track, but the magneto-optical data signal is not available. This is a major shortcoming of this embodiment of the prior art.

Figure 4:
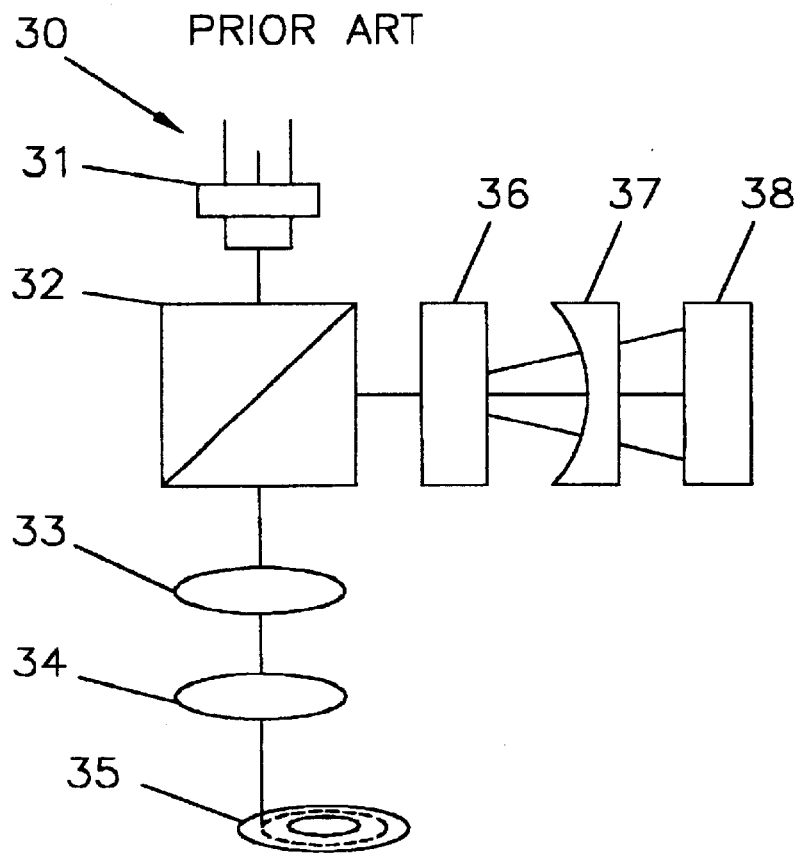
FIG. 4 is another embodiment of the prior art showing the replacement of the bi-wedge with a 3-beam splitter such as a Wollaston prism and an astigmatism lens, which was believed to be necessary for correction of the 3-beam splitter output beams.

An improved embodiment of a focus/tracking system 30 of the prior art is shown in FIG. 4. A beam of light from laser diode 31 passes through beam splitter 32, is collimated by lens 33 and focussed by lens 34. The focussed, collimated beam is reflected from optical disk 35, returns through lens 34, and is collimated by lens 33. Beam splitter 32 redirects the collimated reflected light to Wollaston prism 36, with the resulting three output beams passing through an astigmatic lens 37 to be collected by multi-element detector 38. Astigmatic lens 37 rotates the orientation of the returning collimated reflected light to an orientation of plus or minus 45 degrees off the in-track direction; that is, 45 degrees off of the axis of the in-track direction. Thereby, as the focus of the disk is lost, the three spots of light from the Wollaston prism (the 3-beam output) elongate along the 45 degree axis.

This embodiment of the prior art thereby allows focus error signals, tracking error signals, reflectivity data signals, and magneto-optical data signals to be determined by comparing the magnitudes of selected ones of the output signals derived thereby. However, this embodiment of the prior art does not provide differential signals for the focus error. Since, as discussed, differential signals are less sensitive to misalignment, thermal drifts, and wavelength shifts, especially for common mode type errors, this is an important shortcoming of this embodiment.

Figure 5:
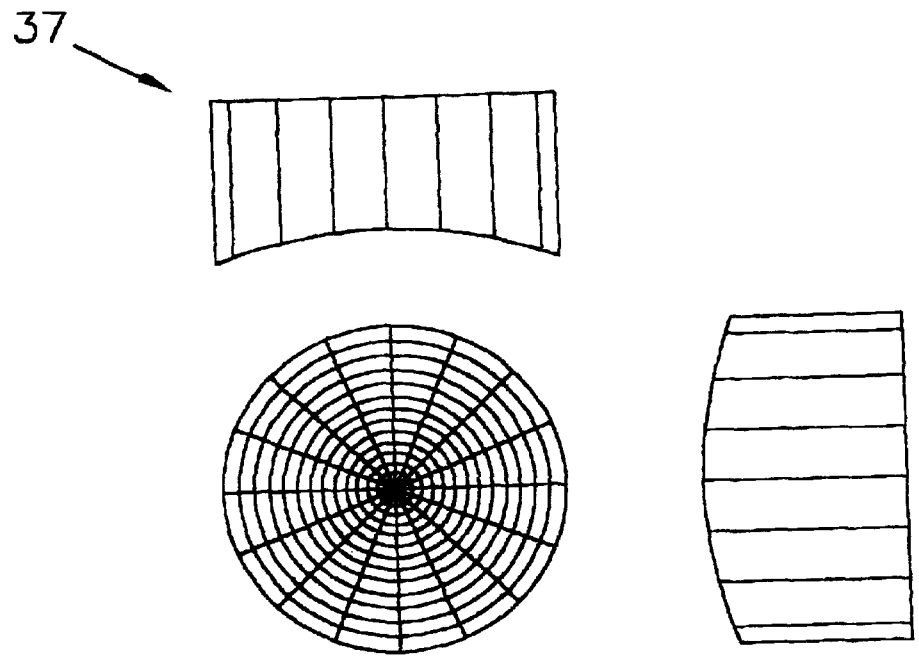
FIG. 5 is an astigmatism lens of the prior art.
Figure 6:
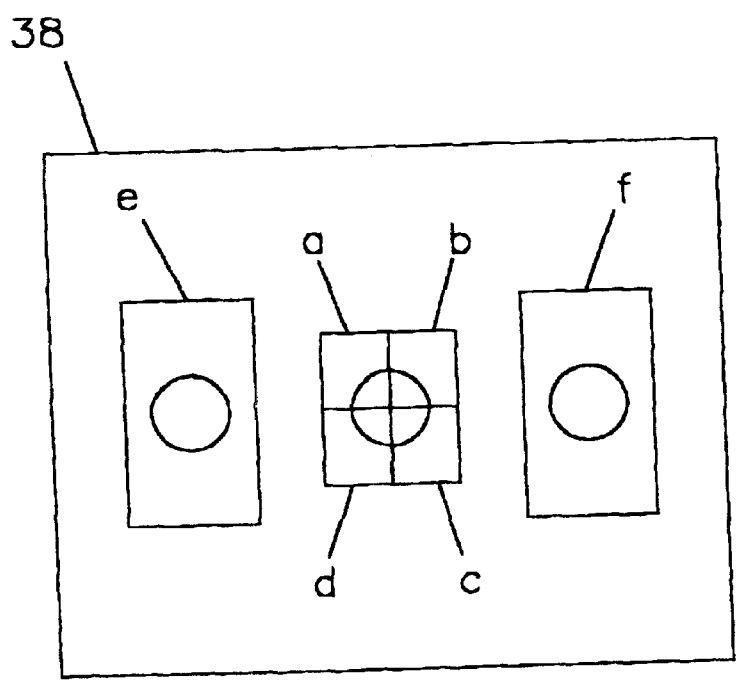
FIG. 6 is another optical detector of the prior art. It shows additional optical sensors whereby an attempt was made to improve the focussing and tracking system of the prior art.
Figure 7:
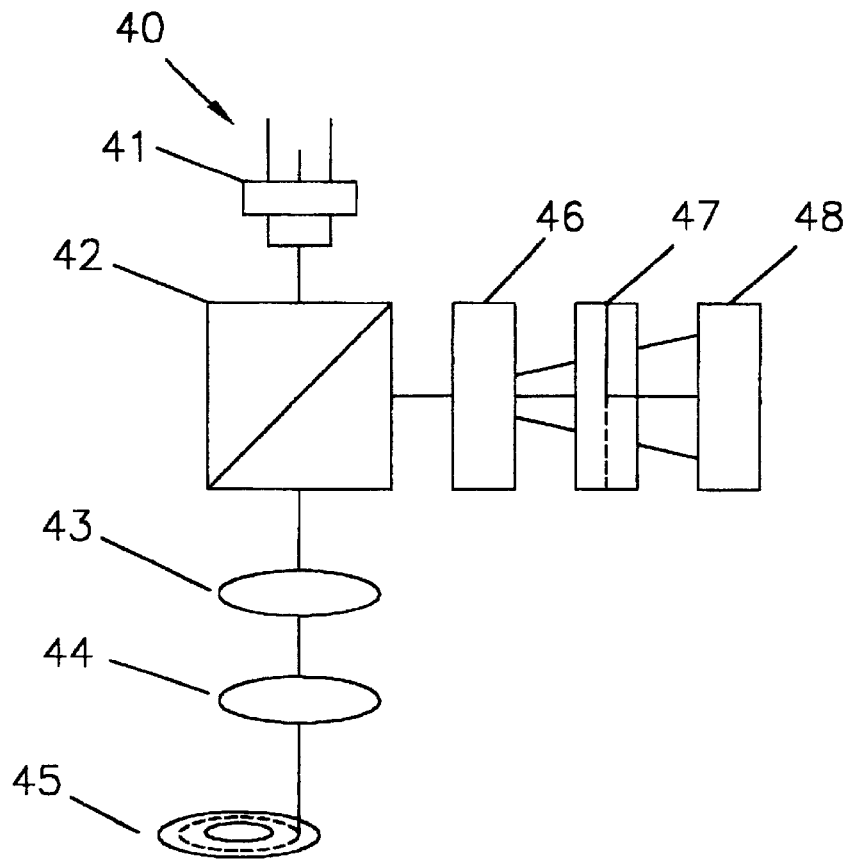
FIG. 7 is an embodiment of the invention. The invention provides differential focus signals thereby.

An astigmatic lens 37 of an embodiment of the prior art is shown in FIG. 5. In this lens, the axes of astigmatism are oriented at 45 degrees to the in-track direction. As shown in FIG. 6, a modified collector 38 comprising sensors 38a, 38b, 38c, 38d, 38e and 38f (shown as a, b, c, d, e and f) are arranged to detect focus error signals, tracking error signals, reflectivity data signals, and magneto-optical data signals. However, the improved focus/tracking system of the prior art using this collector also does not provide differential focus error signals. As discussed before, this is an important shortcoming of the prior art.

Figure 8:
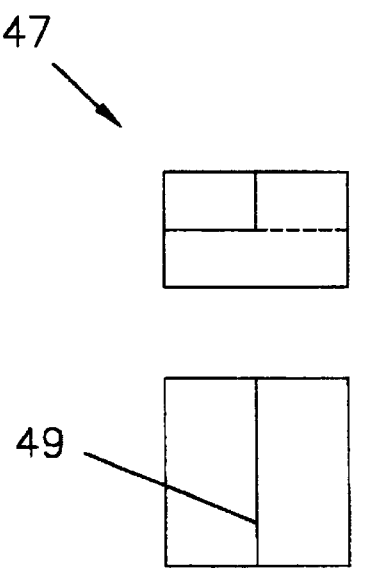
FIG. 8 is a bi-wedge prism used in an embodiment of the invention.
Figure 9:
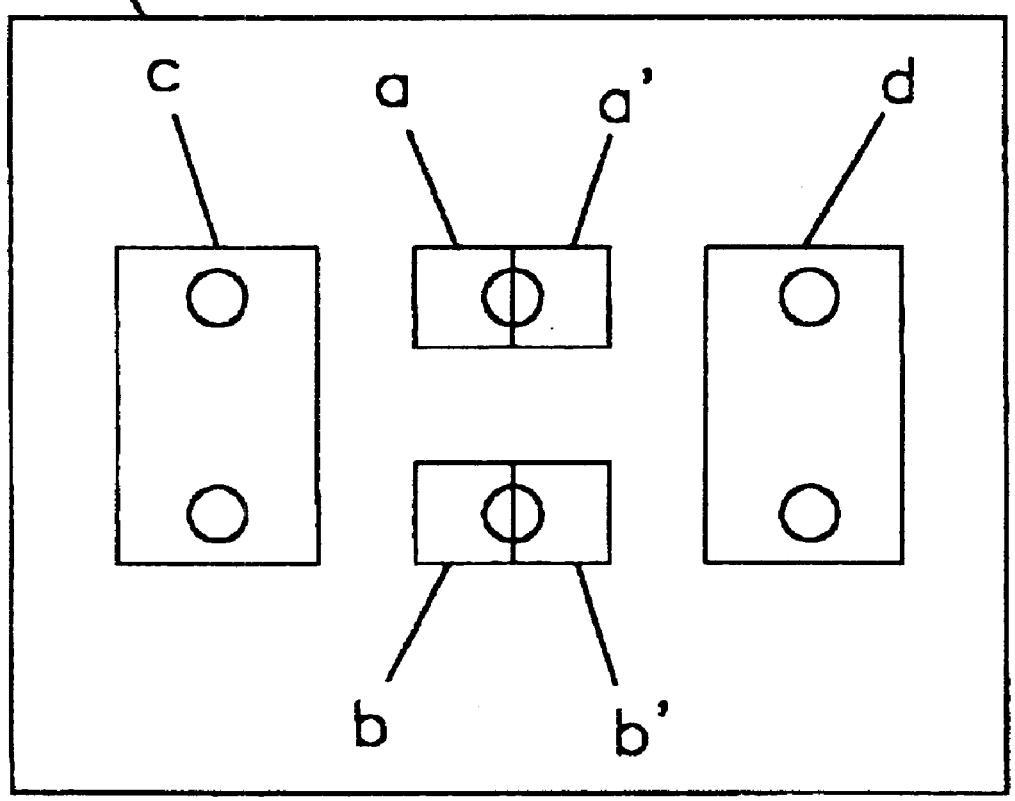
FIG. 9 is an optical detector used in an embodiment of the invention. The optical sensors have been spaced and placed for producing focus error signals, tracking error signals, reflectivity data signals, and magneto-optical data signals; and further providing at least the focussing error signals as differential signals.

The embodiment of the focus/tracking system 48 of the invention in FIG. 9 combines elements of the prior art in a novel way to provide differential focus error signals. Laser diode 41 provides a coherent light beam through beam splitter 42, collimating lens 43, and focusing lens 44 to a track on the data media 45. The reflected beam then returns through lenses 43 and 44 to beam splitter 42, where it is redirected to Wollaston prism 46, then on to bi-wedge 47 and on to collector 48. While bi-wedge 47 in FIG. 8, which is essentially the same bi-wedge as that shown in FIG. 2, with a plane 29 of bi-wedge 47 parallel to the in-track direction, was essentially shown in the prior art, and astigmatic lenses were shown in the prior art combined with Wollaston prisms, in the invention the Wollaston prism 46 is combined with the bi-wedge 47 and a novel collector 48. Whereas the prior art taught correcting the collimated reflected beam with an astigmatic lens when it was passed through a Wollaston prism, the invention uses a bi-wedge as shown to define a differential signal for focus error. This embodiment provides all four of the desired signals, focus error signal, tracking error signal, reflectivity data signal, and magneto-optical data signal, but further provides differential focus error signals. By providing a pair of differential signals, one of the pair will be decreasing in amplitude while the other will be increasing in amplitude. Thereby common mode errors such as thermal effects, which will affect both differential focus error signals equally, wavelength shifts, which generally also affect both signals equally, misalignment errors, which may affect both signals equally, can be differentially rejected by the common mode rejection (CMR) of an amplifier accepting these signals.

What is claimed is:

1. A focus and tracking error system comprising:
   a light source;
   a beam splitter;
   a collimating lens;
   a focusing lens;
   a 3-beam splitter;
   a beam diverter;
   an optical detector;
   said light source passing a beam through said beam splitter, said collimating lens, said focusing lens, to a data media having a groove or track of the type used for providing positioning for a write/read head writing and reading data from and to said data media;
   said beam reflecting from said track through said focusing lens and said collimating lens into said beam splitter;
   said beam splitter directing said beam into said 3-beam splitter, creating 3 beams thereby;
   said 3-beam splitter directing said 3 beams into said beam diverter, whereby said 3 beams are further diffracted for separating said 3 beams further into a left, center, and right beam;
   said 3 beams impinging on said optical detector;
   said left and right beams cooperating to provide a pair of differential focus signals, whereby one of said pair of differential signals is decreasing in amplitude when the other one of said pair of differential signals is increasing in amplitude; and
   combinations of said left, center and right beams further providing one or more of positioning signals, reflectivity data signals, and magneto-optical data signals.

2. The focusing and tracking system of claim 1 wherein:
   said 3-beam splitter is a Wollaston prism.

3. The focusing and tracking system of claim 1 wherein:
   said beam diverter is a bi-wedge prism.

4. The focusing and tracking system of claim 1 wherein:
   said light source is a laser diode.

5. The focusing and tracking system of claim 4 wherein:
   said laser diode produces coherent light.

6. The focusing and tracking system of claim 5 wherein:
   said coherent light produces substantially a single frequency light.

7. The focusing and tracking system of claim 1 wherein:
   said optical detector comprises a plurality of spaced, formed optical detectors for receiving said 3 beams of light from said beam diverter and producing electrical signals thereby.

8. A method for providing a focus and tracking error system comprising:
   a step of providing a light source;
   a step of providing a beam splitter;
   a step of providing a collimating lens;
   a step of providing a focusing lens;
   a step of providing a 3-beam splitter;
   a step of providing a beam diverter;
   a step of providing an optical detector;
   a step of providing said light source passing a beam through said beam splitter, said collimating lens, said focusing lens, to a data media having a groove or track of the type used for providing positioning for a write/read head writing and reading data from and to said data media;
   said beam reflecting from said track through said focusing lens and said collimating lens into said beam splitter;
   a step of providing said beam splitter directing said beam into said 3-beam splitter, creating 3 beams thereby;
   a step of providing said 3-beam splitter directing said 3 beams into said beam diverter, whereby said 3 beams are further diffracted for separating said 3 beams further into a left, center, and right beam;
   said 3 beams impinging on said optical detector;
   a step of providing said left and right beam cooperating to provide a pair of differential focus signals, whereby one of said pair of differential signals is decreasing in amplitude when the other one of said pair of differential signals is increasing in amplitude; and
   a step of providing combinations of said left, center and right beams further providing one or more of positioning, signals reflectivity data signals, and magneto-optical data signals.

9. The method of claim 8 wherein:
   said 3-beam splitter is a Wollaston prism.

10. The method of claim 8 wherein:
    said beam diverter is a bi-wedge prism.

11. The method of claim 8 wherein:
    said light source is a laser diode.

12. The method of claim 11 wherein:
    said laser diode produces coherent light.

13. The method of claim 12 wherein:
    said coherent light produces substantially a single frequency light.

14. The method of claim 8 wherein:
    said optical detector comprises a plurality of spaced, formed optical detectors for receiving said 3 beams of light from said beam diverter and producing electrical signals thereby.

* * * * *

UNITED STATES PATENT AND TRADEMARK OFFICE
CERTIFICATE OF CORRECTION

PATENT NO.  : 6,459,660 B1  Page 1 of 1
DATED       : October 1, 2002
INVENTOR(S) : Ronald E. Gerber and Edward C. Gage It is certified that error appears in the above-identified patent and that said Letters Patent is hereby corrected as shown below:

<u>Title page,</u>
Item [73], please change the assignee to read as follows:

-- Seagate Technology LLC --

Signed and Sealed this

Twenty-eighth Day of January, 2003

JAMES E. ROGAN
*Director of the United States Patent and Trademark Office*